United States Patent
Amaru et al.

(10) Patent No.: US 10,839,117 B1
(45) Date of Patent: Nov. 17, 2020

(54) ROBUST EXCLUSIVE SUM-OF-PRODUCT (ESOP) REFACTORING

(71) Applicant: Synopsys, Inc., Mountain View, CA (US)

(72) Inventors: Luca Gaetano Amaru, Santa Clara, CA (US); Patrick Vuillod, St. Bernard du Touvet (FR); Jiong Luo, Fremont, CA (US); Winston J. Haaswijk, Lausanne (CH)

(73) Assignee: Synopsys, Inc., Mountain View, CA (US)

(*) Notice: Subject to any disclaimer, the term of this patent is extended or adjusted under 35 U.S.C. 154(b) by 0 days.

(21) Appl. No.: 16/126,696

(22) Filed: Sep. 10, 2018

Related U.S. Application Data

(60) Provisional application No. 62/556,222, filed on Sep. 8, 2017.

(51) Int. Cl.
*G06F 17/50* (2006.01)
*G06F 30/327* (2020.01)
*G06F 111/06* (2020.01)

(52) U.S. Cl.
CPC ........ *G06F 30/327* (2020.01); *G06F 2111/06* (2020.01)

(58) Field of Classification Search
CPC .... G06F 30/30; G06F 30/392; G06F 2119/12; G06F 30/327; G06F 30/39; G06F 30/394; G06F 30/3312; G06F 8/452; G06F 12/08; G06F 15/17381; G06F 2115/10; G06F 8/40; G06F 8/4452; G06F 9/52; G06F 8/447; G06F 30/33; G06F 30/396; G06F 2111/02; G06F 2111/20; G06F 9/3001; G06F 13/1668; G06F 15/7892; G06F 15/82; G06F 30/00; G06F 30/367; G06F 30/398; G06F 9/30029; G06F 9/30036; G06F 9/3004; G06F 9/30076; G06F 9/30145; G06F 9/38; G06F 9/3802; G06F 9/3869; G06F 9/4494; G06F 11/267; G06F 13/4027; G06F 15/7867; G06F 16/43; G06F 16/953; G06F 1/10; G06F 2111/04; G06F 2119/06; G06F 21/629; G06F 21/74; G06F 21/76; G06F 21/81; G06F 30/34; G06F 7/5306; G06F 7/5312; G06F 7/5443; G06F 9/3005; G06F 9/30178; G06F 9/381; G06F 9/3885; G06F 9/3897; G06F 9/543; H01L 2224/16225;
(Continued)

(56) References Cited

U.S. PATENT DOCUMENTS

2005/0183046 A1   8/2005  Dougherty, Jr.
2008/0276209 A1*  11/2008 Albrecht ................. G06F 30/30
                                                      716/113
(Continued)

*Primary Examiner* — Binh C Tat
(74) *Attorney, Agent, or Firm* — Park, Vaughan, Fleming & Dowler LLP; Laxman Sahasrabuddhe

(57) ABSTRACT

Robust logic optimization on an IC design based on exclusive sum-of-products (ESOP) refactoring is described. ESOP expressions are two-level logic representation forms, similar to sum-of-product SOP representations. However, since ESOPs use exclusive-OR (XOR) instead of OR operators they can be exponentially more compact than sum-of-product (SOP) expressions for important classes of functions. In XOR heavy logic, ESOP expressions allow us to find optimizations that SOPs simply do not have access to.

12 Claims, 6 Drawing Sheets

(58) Field of Classification Search
CPC ........ H01L 2224/4824; H04N 21/4318; H04N 21/44222; H03K 19/018585; H03K 19/02; H03K 19/20; H03K 19/0013; H03K 5/131
USPC .................................. 716/100–109, 132–135
See application file for complete search history.

(56) References Cited

U.S. PATENT DOCUMENTS

| | | |
|---|---|---|
| 2013/0339914 A1 | 12/2013 | Vrudhula |
| 2014/0033161 A1* | 1/2014 | Mottaez ............... G06F 17/5081 716/134 |
| 2016/0055270 A1 | 2/2016 | Chuang |
| 2017/0177750 A1* | 6/2017 | Gaillardon ............ G06F 17/505 |

* cited by examiner

Input : Truth table $T$
Output : Integer hash $h$ of $T$
1 Function hash_tt($T$)
2     set $h \leftarrow$ hash_function($T.block[0]$);
3     for $i \in \{1, \ldots, T.nblocks - 1\}$ do
4        set $h' \leftarrow$ hash_function($T.block[i]$);
5        $h \leftarrow$ hash_combine($h, h'$);
6     end
7 return $h$;

FIG. 1

Input : Truth table $T$, variable $i$, and expansion cache $c$
Output : Total PKRM expansion cost
1 Function find_expansions($T, c, i$)
2     if ($f == 0$) then return $0$;
3     if ($f == 1$) then return $1$;
4     set $h \leftarrow$ hash_tt($T$);
5     if (cache_check($c, f$)) then return cache_get($c, f$);
6     set $ex0 \leftarrow$ find_expansions($T_{x'_i}$);
7     set $ex1 \leftarrow$ find_expansions($T_{x_i}$);
8     set $ex2 \leftarrow$ find_expansions($T_{x'_i} \oplus T_{x_i}$);
9     set $maxe \leftarrow \max(ex0, ex1, ex2)$;
10     if ($maxe == ex0$) then
11        set $cost \leftarrow ex1 + ex2$ ;
12        set $exp \leftarrow$ pos_davio ;
13     else if ($maxe == ex1$) then
14        set $cost \leftarrow ex0 + ex2$ ;
15        set $exp \leftarrow$ neg_davio ;
16     else if ($maxe == ex2$) then
17        set $cost \leftarrow ex0 + ex1$ ;
18        set $exp \leftarrow$ boole ;
19     cache_insert($c, T, (cost, exp)$)
20 return $cost$;

FIG. 2A

```
Input   : ESOP cover o, tt T, variable i, cache c, var queue q
Output  : PKRM expression
Function construct_pkrm(o, T, i, c, q)
    if (tt_is_const_zero(T)) then return;
    if (tt_is_const_one(T)) then cover_add_queue(o, q) ;
      return;
    set h ← hash_tt(T) ;
    set (cost, exp) ← cache_get(c, h) ;
    if (exp == pos_davio) then
        queue_push(q, $x_i^{\{0,1\}}$) ;
        construct_pkrm(o, $T_{x_i'}$, i + 1, c, q) ;
        queue_pop(q) ;
        queue_push(q, $x_i^{\{1\}}$) ;
        construct_pkrm(o, $T_{x_i'} \oplus T_{x_i}$, i + 1, c, q) ;
        queue_pop(q) ;
    else if (exp == neg_davio) then
        queue_push(q, $x_i^{\{0,1\}}$) ;
        construct_pkrm(o, $T_{x_i}$, i + 1, c, q) ;
        queue_pop(q) ;
        queue_push(q, $x_i^{\{0\}}$) ;
        construct_pkrm(o, $T_{x_i'} \oplus T_{x_i}$, i + 1, c, q) ;
        queue_pop(q) ;
    else
        queue_push(q, $x_i^{\{0\}}$) ;
        construct_pkrm(o, $T_{x_i'}$, i + 1, c, q) ;
        queue_pop(q) ;
        queue_push(q, $x_i^{\{1\}}$) ;
        construct_pkrm(o, $T_{x_i}$, i + 1, c, q) ;
        queue_pop(q) ;
return ;
```

FIG. 2B

```
Function cover_add_queue(cover, q)
    set C_S ← new_cube() ;
    foreach lit ∈ q do
      | cube_add_lit(C_S, lit)
    end
    rec_cover_add_cube(cover, C_S)
return ;
```

FIG. 2C

```
Function rec_cover_add_cube(cover, C_S)
    if (C_S == nil) then return ;
    foreach C_R ∈ cover do
        if (distance(C_S, C_R) ≤ 1) then
            set C_T ← exorlink(C_S, C_R) ;
            return rec_cover_add_cube(C_T) ;
    end
    cover_add_cube(cover, C_S)
return ;
```

FIG. 2D

Input : Logic network $G$ and minimized ESOP expression $E$
Output : Refactored logic network
Function refactor($G, E$)

Initialization 302:
    set $nout \leftarrow$ num_po($G$);
    set $outlists \leftarrow$ new_lists($nout$);
    set $ncubes \leftarrow$ num_cubes($E$);
    set $G' \leftarrow$ new_net();

Cube separation 304:
    foreach $i \in \{1, \ldots, ncubes\}$ do
        set $C_i \leftarrow$ get_cube($E, i$);
        set $PO_{G'_i} \leftarrow$ net_add_output($G', C_i, i$);
        foreach $j \in \{1, \ldots, nout\}$ do
            if (is_output_affected($C_i, j$) then
                list_add($outlists[j], PO_{G'_i}$) ;
        end
    end

AIG optimization 306:
    aig_decompose($G'$) ;
    aig_optimize($G'$) ;

XOR tree construction 308:
    foreach $i \in \{1, \ldots, nout\}$ do
        set $G_i \leftarrow$ balanced_xor_decomp($outlists[i]$);
        net_add_output($G', G'_i, ncubes + i$)
    end
    foreach $i \in \{1, \ldots, ncubes\}$ do
        net_del_output($G', i$)
    end return $G'$;

ROBUST EXCLUSIVE SUM-OF-PRODUCT (ESOP) REFACTORING

RELATED APPLICATION

This application claims benefit of U.S. Provisional Application Ser. No. 62/556,222, filed on 8 Sep. 2017, by the same inventors, the contents of which are herein incorporated by reference in their entirety for all purposes.

This application is related to co-pending U.S. patent application Ser. No. 16/125,472, filed on 7 Sep. 2018, entitled "Integrated Circuit (IC) Optimization Using Boolean Resynthesis," the contents of which are herein incorporated by reference in their entirety for all purposes.

BACKGROUND

Technical Field

This disclosure relates to integrated circuit (IC) optimization. More specifically, this disclosure relates to IC optimization using robust exclusive sum-of-product (ESOP) refactoring.

Related Art

Advances in process technology and an almost unlimited appetite for electronics have fueled a rapid increase in the size and complexity of integrated circuit (IC) designs. Logic optimization techniques are used to improve performance and quality-of-results (QoR) of an IC design. The two-level sum-of-products (SOP) representation is perhaps the most widely used way to represent Boolean functions. However, it is not necessarily the most efficient one. What are needed are improved techniques and systems for logic optimization.

SUMMARY

Some embodiments described herein provide techniques and systems for performing robust logic optimization on an IC design based on ESOP expressions that can be used to refactor logic networks. ESOP expressions are two-level logic representation forms, similar to sum-of-product SOP representations. However, since ESOPs use exclusive-OR (XOR) instead of OR operators they can be exponentially more compact than SOP expressions for important classes of functions. In XOR heavy logic, ESOP expressions allow us to find optimizations that SOPs simply do not have access to. Embodiments described herein show significant improvements to a similar optimization flow based on SOPs.

During operation, a set of ESOP expressions can be generated based on a logic network, wherein a cube is a product of literals, and each ESOP is an exclusive-OR of two or more cubes. Next, the set of ESOP expressions can be minimized to obtain a set of minimized ESOP expressions. An intermediate logic network can then be generated by extracting cubes from the set of minimized ESOP expressions.

Next, the intermediate logic network can be optimized to obtain an optimized intermediate logic network. Specifically, optimizing the intermediate logic network can involve: (1) decomposing the intermediate logic network into an and-inverter graph (AIG), wherein the AIG is a network of AND gates whose inputs can be inverted; and (2) optimizing the AIG.

Finally, an optimized logic network can be constructed that is functionally equivalent to the original logic network by adding a set of balanced XOR trees to the optimized intermediate logic network. Specifically, outputs of the optimized intermediate logic network are inputs to the set of balanced exclusive-OR trees, and the outputs of the set of balanced exclusive-OR trees are primary outputs of the optimized logic network.

BRIEF DESCRIPTION OF THE FIGURES

FIG. 1 illustrates a process for computing a hash for a truth table in accordance with some embodiments described herein.

FIGS. 2A-2D illustrate a two-pass process for computing the Pseudo-Kronecker Forms (PKRMs) for a logic network in accordance with some embodiments described herein.

FIGS. 3A-3B illustrate a process for XOR refactoring in accordance with some embodiments described herein.

DETAILED DESCRIPTION

Figure 3B:
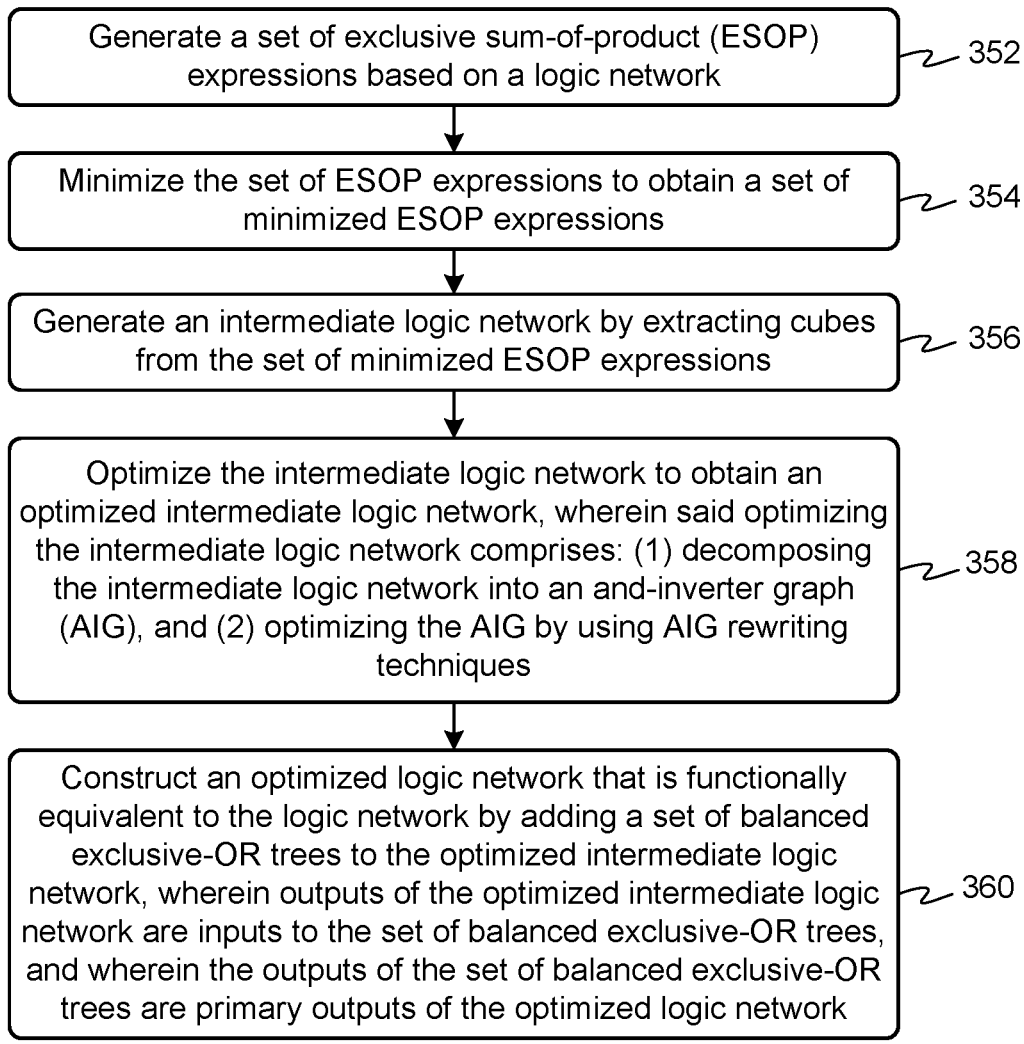

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of IC Design and Manufacturing

An IC design and manufacturing process produces IC chips. IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results (QoR).

An IC design can be represented by using different data formats or languages as the IC design progresses through an IC design flow, wherein the different data formats or languages represent the IC design at different levels of abstraction. In general, higher levels of abstraction contain fewer details of the IC design than lower levels of abstraction. Typically, the IC design is described at a high level of abstraction in the early stages of the IC design flow, and the level of abstraction becomes progressively lower as the IC design moves through the IC design flow (the description of the IC design becomes more specific as the IC design progresses through the IC design flow).

For example, toward the beginning of the IC design flow, an IC design can be described at a high level of abstraction by using a hardware description language (HDL) which describes the functionality of the IC design but does not provide any information about the actual geometric shapes that will be printed on the wafer. Toward the end of the IC design flow, the same IC design can be represented in a low level of abstraction by using a data format or language such as GDSII or OASIS, which contains a description of the actual geometric shapes that are to be printed on the wafer. In between the two ends of the IC design flow, the IC design may be represented in numerous data formats or languages that describe the same IC design at different levels of abstraction.

Some examples of IC design steps and the associated software tools are described below. These examples are for illustrative purposes only and are not intended to limit the embodiments to the forms disclosed. This disclosure describes embodiments that can be used in one or more IC design steps.

IC design software tools enable IC designers to describe the functionality that the IC designers want to implement. These tools also enable IC designers to perform what-if planning to refine functionality, check costs, etc. During logic design and functional verification, the HDL, e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence (i.e., equivalence checking) with the RTL design and/or HDL code.

During design planning, an overall floorplan for the chip can be constructed and analyzed for timing and top-level routing. During physical implementation, circuit elements can be positioned in the layout and can be electrically connected.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Overview of IC Optimization Using Robust ESOP Refactoring

Some embodiments described herein represent Boolean logic using the exclusive-sum-of-products (ESOP) representation. ESOPs differ from the SOPs in that they use the XOR instead of the OR operator. Both SOP and ESOP expressions can be used to represent any Boolean function, however ESOPs have the theoretical advantage of being more compact for important classes of functions. For example, the following logic functions show the different representation sizes required for a 4-input parity logic function by using SOPs and ESOPs, respectively:

SOPs: $ab\bar{c}\bar{d}+a\bar{b}\bar{c}d+a\bar{b}c\bar{d}+\bar{a}b\bar{c}d+\bar{a}bc\bar{d}+\bar{a}\bar{b}cd+ab\bar{c}d+abc\bar{d}$
ESOPs: $a \oplus b \oplus c \oplus d$ The following table shows the size differences between SOPs and ESOPs for a number of function classes. Specifically, the table shown below provides a comparison between the number of cubes used by SOP and ESOP expressions for important function classes. The following table is from T. Sasao, "EXMIN2: A Simplification Algorithm for Exclusive-OR-Sum-of-Products Expressions for Multiple-Valued-Input Two-Valued-Output Functions," IEEE Transactions on CAD, vol. 12, no. 5, pp. 621-632, 1993, the contents of which are herein incorporated by reference in its entirety for providing further details on ESOPs. In the table below, we can see that, in general, there can be an exponential difference in the number of product terms needed to represent certain functions.

| Function Class | SOP Cubes | ESOP Cubes |
| --- | --- | --- |
| Arbitrary functions | $2^{n-1}$ | $\frac{1}{2} \cdot 2^{n-1}$ |
| Symmetric functions | $2^{n-1}$ | $\frac{2}{3} \cdot 3^{n/2}$ |
| Parity functions | $2^{n-1}$ | n |

ESOP minimization refers to the process of finding a minimal ESOP representation for a given function. There is no known efficient algorithm for finding the exact minimum ESOP expression for arbitrary functions. Currently, finding such minima can only be done for arbitrary functions up to 6 variables, or up 10 variables for specific classes of functions. Therefore, various types of heuristic ESOP minimization have been developed. Most recent attempts at heuristic minimization algorithms are based upon the iterative application of cube transformations. The Exorlink operation, introduced in N. Song and M. A. Perkowski, "EXORCISM-MV-2: Minimization of Exclusive Sum of Products Expressions for Multiple-valued Input incompletely Specified Functions," in Proc. ISMVL, 1993, pp. 132-137, generalized various other cube transformations (e.g. the xlinking and unlinking operations) and integrated them into a single transformation. Finally, ESOP minimization is harder than SOP minimization, due to the fact that ESOP minimization is a binate covering problem, whereas SOP minimization is a unate covering problem.

Besides theoretical and academic motivations, a key driving factor in the progress of ESOP minimization has been the construction of programmable logic arrays (PLAs). By replacing the OR array with an XOR array in a PLA, we obtain a so-called AND-XOR PLA. Such PLAs have advantages over conventional PLAs as they are easier to test and require less hardware.

For circuit designs that contain XOR-heavy logic, conventional methods based on SOP representations may miss out on some optimizations because they cannot find compact XOR representations. Any logic optimization method based on either SOPs or ESOPs should be aware of these differences, as well as the limitations of either representation. This disclosure presents a novel logic optimization method based on ESOP collapsing, optimization, and refactoring. The techniques described in this disclosure can be integrated into an existing commercial optimization framework that is based on window enumeration and truth table computation. Such integration imposes stringent design requirements, leading to the robust optimization method presented in this paper.

Embodiments that use the ESOP optimization techniques disclosed herein were compared to a conventional collapsing flow based on SOPs, and show significant improvements, reducing logic levels by up to 83.3% and by 44.6% on average. Further, compared to the conventional SOP flow, our method is able to reduce average logic network size by 21.4%. Finally, we integrate our method into a commercial synthesis flow. On a set of 46 industrial benchmarks we show average improvement, after placement and routing, of 1.08% in area, 0.93% in leakage power, and 0.15% in worst negative slack.

Preliminaries

Given a Boolean function $f: \mathbb{B}^n \to \mathbb{B}$, we write the cofactor of $f$ with respect to variable $x_i$ as $f_{\bar{x}_i}$ for $f_{x_i}=0$ and $f_{x_i}$ for $x_i=1$. We can then define the following expansions of the function:

$$f = \bar{x}_i f_{\bar{x}_i} \oplus x_i f_{x_i} \quad \text{Boole's expansion}$$

$$f = f_{\bar{x}_i} \oplus x_i (f_{\bar{x}_i} \oplus f_{x_i}) \quad \text{positive Davio expansion}$$

$$f = f_{x_i} \oplus \bar{x}_i (f_{\bar{x}_i} \oplus f_{x_i}) \quad \text{negative Davio expansion}$$

A literal is a Boolean variable in either positive or negative polarity. For example, the variable $x_i$ may be written in negative polarity as $\bar{x}_i$. In the context of ESOP minimization, it is useful to extend this definition to work with multiple-valued literals. Let $P_i = \{0, \ldots, p_{i-1}\}$ be a set of i permissible values. Then, for any subset $S_i \subseteq P_i$, we can define a literal $x_i^{S_i}$ as:

$$x_i^{S_i} = \begin{cases} 1, & \text{if } x_i \in S_i \\ 0, & \text{otherwise} \end{cases}$$

For example, with this extended definition we can write $x_i^{\{0\}}$ to indicate $\bar{x}_i$. It also allows us to write don't care literals as $x_i^{\{0,1\}}$.

A cube is a product of literals, and is 1 if and only if all its literals are 1. Cubes are sometimes called products or product terms. An EXOR of two cubes evaluates to 1 if and only of the two cubes have different values. An ESOP is the exclusive-or (XOR) of a set of cubes.

It is desirable to be able to use ESOP expressions to represent multiple-output functions. In order to do this, we can use our multiple-valued literal definitions to view cubes as having an input part and an output part. The input part of a cube is the conjunction of the literals in the cube. The output part of a cube is an additional multiple-valued literal which has as many permissible values as there are outputs. This allows us to share cubes between outputs, which enables the minimization of a single ESOP for multiple outputs, without having to minimize separate ESOPs for each output.

For example, we could write a 3-input 2-output function in the following way:

$x_1^{\{0\}} x_2^{\{0\}} x_3^{\{1\}} y^{\{0\}} \oplus$
$x_1^{\{0\}} x_2^{\{1\}} x_3^{\{0\}} y^{\{0\}} \oplus$
$x_1^{\{1\}} x_2^{\{0\}} x_3^{\{1\}} y^{\{0,1\}} \oplus$
$x_1^{\{1\}} x_2^{\{0,1\}} x_3^{\{1\}} y^{\{0,1\}}$ Here, the $x_i$ variables determine the input-part, and the y variable the output-part of the cubes. In this example, the first two cubes only affect the first output. The last two cubes affect both outputs. Note that variable $x_2$ is a don't care in the last cube.

We say that cubes $C_S$ and $C_R$ coincide in a variable $x_i$ if $x_i^{S_i} \in C_S$, $x_i^{R_i} \in C_R$ and $S_i = R_i$. The distance between two cubes is defined to be the number of variables in which the cubes do not coincide. For example, the distance between cubes $x_1^{\{1\}} x_2^{\{0\}} x_3^{\{1\}} y^{\{0,1\}}$ and $x_1^{\{1\}} x_2^{\{0,1\}} x_3^{\{1\}} y^{\{0,1\}}$ is 1.

Over the years, different cube operations have been developed in the context of ESOP minimization. The ExorLink operation is a generalization of several different such transformations. It works by replacing a pair of cubes by a set of new cubes in a way that does not change the functionality of the ESOP. The formal definition of the ExorLink of two cubes $C_S$ and $C_R$ is as follows:

$$C_S \otimes S_R = \oplus \{x_1^{S_1} \ldots x_i^{S_i \oplus R_i} \ldots x_n^{R_n} | \forall i : S_i \neq R_i\}$$

Hence, the number of cubes that replaces the pair is equal to the distance between the cubes. For example, if we apply ExorLink on two distance-0 cubes, this is equivalent to removing them from the expression. Intuitively, whenever we have two equivalent cubes in an ESOP expression, they cancel each other out. Thus, by applying ExorLink to cubes with different distances, we can use it to reshape and minimize ESOP expressions. Further details on ExorLink can be found in N. Song and M. A. Perkowski, "Minimization of Exclusive Sum of Products Expressions for Multiple-Valued Input," IEEE Trans. on CAD, vol. 15, no. 4, pp. 385-395, 1996, the contents of which are herein incorporated by reference in their entirety to provide details of ExorLink.

A logic network can be viewed as a directed acyclic graph with some additional structure. Where we would write $G=(V, E)$ to represent a DAG, we write $G=(V_G, E_G, PI_G, PO_G, F_G)$ for a logic network. Here, $PI_G$ corresponds to the primary inputs to the network, and $PO_G$ corresponds to the primary outputs. All other nodes correspond to logic gates. Through the logic gates, a logic network computes a multiple-output Boolean function $F_G$, from the primary inputs to the primary outputs. Edges in the graph represent wires between gates. An and-inverter graph (AIG) is a specific type of logic network in which each node corresponds to an AND gate. In an AIG, we typically allow for node inputs to be inverted without the need for explicit inverter gates.

Given a logic network G and a node n in $V_G$, a cut $C=(n, I, f)$ of G consists of a set of nodes I such that every path from a primary input to n passes through a node in I. The node n is called the root or output of the cut and the nodes in I are called the leaves of the cut. Each cut corresponds to a cut function $f: B^{|I|} \to B$, which is a Boolean function defined on the leaves of the cut. Intuitively, one may think of a cut as inducing a subgraph of the logic network that consists of the nodes between the leaves I and the output n. Therefore, cuts can be used to partition a logic network into a set of subnetworks. A window $W=(N; I; F)$ is a generalization of a cut with multiple outputs N. There is no real distinction between logic networks and windows, other than the fact that windows are explicitly subnetworks of some larger network. But we may view a window as a logic network: $W=(V_W, E_W, I, N, F)$, where $V_W$ and $E_W$ are the nodes and edges in the subgraph between the window's leaves and outputs.

ESOP Collapsing

This section describes how our method for ESOP collapsing works. Subsequent sections explain how ESOP expressions are minimized and how the minimized expressions are used to refactor the circuit. An important aspect of the techniques and systems described herein is the integration within a larger existing optimization framework. Given a logic network, the optimization framework uses advanced cut enumeration techniques to generate windows of the network. Recall that a window can be viewed as a multi-output cut. Next, the framework generates truth tables for all nodes within the window. This is done using a fast truth table package that efficiently scales up to 16 variables. Finally, the framework invokes a logic optimization script, and replaces the existing window with the optimized one. Further details of the overall optimization framework can be found in a co-pending U.S. patent application Ser. No. 16/125,472, filed on 7 Sep. 2018, entitled "Integrated Circuit (IC) Optimization Using Boolean Resynthesis."

The techniques described herein for ESOP collapsing, ESOP expression minimization, refactoring can be used in one of the scripts that may be invoked by the optimization framework to optimize the generated windows. In other words, given a logic network G=(V, E), the optimization framework generates a sequence of windows (subnetworks) ($G_1, G_2, \ldots, G_n$) upon which techniques disclosed herein act. Note that this process is completely transparent to the techniques disclosed herein. Specifically, the techniques disclosed herein do not have a no notion of windows, and they view the sequence of windows as independent logic networks. The first step, ESOP collapsing, takes place in this context. Hence, in the remainder of this disclosure, we will simply discuss the optimization of logic networks, without referring explicitly to windows.

The goal of ESOP collapsing is to flatten a multi-level logic network to an ESOP expression. This requires us to generate ESOP expressions for all outputs of the network. Since the ESOP collapsing process operates within the larger optimization framework, we already have their corresponding truth tables "for free". Specifically, the co-pending U.S. patent application Ser. No. 16/125,472, filed on 7 Sep. 2018, entitled "Integrated Circuit (IC) Optimization Using Boolean Resynthesis" discloses a technique for generating a sequence of windows in a logic network, and selectively generating truth-tables for those windows that are promising candidates for optimization. The techniques described in this disclosure collapse the truth tables corresponding to output nodes into ESOP expressions, by converting them to so-called Pseudo-Kronecker Forms (PKRMs). PKRMs are a specific subset of ESOP expressions that can be generated using only positive/negative Davio expansion and Boole's expansion. They are considered to be a good starting point for ESOP minimization. PKRMs are commonly generated from Binary Decision Diagrams (BDDs). However, as our algorithm already has access to truth tables, there is no need for us to build additional BDDs for this purpose. Instead, we adapt conventional algorithms and generate PKRMs by using the fast truth table package that is disclosed in co-pending U.S. patent application Ser. No. 16/125,472, filed on 7 Sep. 2018, entitled "Integrated Circuit (IC) Optimization Using Boolean Resynthesis". Further details on PKRMs can be found in (1) A. Mishchenko and M. A. Perkowski, "Fast heuristic minimization of exclusive-sums-of-products," in Proc. RM Workshop, 2001, pp. 242-250, and (2) R. Drechsler, "Pseudo-Kronecker Expressions for Symmetric Functions," IEEE Transactions on Computers, vol. 48, no. 9, pp. 987-990, 1999. The contents of these two documents are herein incorporated by reference in their entirety to provide a background for PKRMs.

Some techniques to generate PKRMs use the built-in hash tables from BDD packages to speed up computation. We emulate this approach by developing an efficient hash table implementation on top of the truth table package.

FIG. 1 illustrates a process for computing a hash for a truth table in accordance with some embodiments described herein. The pseudocode illustrated in FIG. 1 is self-explanatory. Specifically, a truth tables can be viewed as a strings of bits. A truth table of n bits can therefore be compactly represented by a vector of n/w numbers, where w is the word size. Each number in such a vector is called a block. In order to compute the hash of a truth table, we compute the hashes for all of its blocks, and merge them together using a hash combinator function. In this manner, some embodiments are able to quickly and efficiently compute a hash for a truth table. By enabling fast truth table hashing, we now have a way of constructing PKRMs from truth tables without constructing additional data structures such as BDDs.

FIGS. 2A-2D illustrate a two-pass process for computing the PKRMs for a logic network (e.g., a window) in accordance with some embodiments described herein. FIG. 2A illustrates the first pass, and FIGS. 2B-2D illustrate the second pass. The pseudocode illustrated in FIGS. 2A-2D is self-explanatory. The overall process takes as input a truth tables and returns its PKRM.

In the first pass, illustrated in FIG. 2A, the truth table is expanded by caching subfunctions using our efficient hash function. PKRMs allow three types of expansions: positive Davio, negative Davio, and Boole's expansion. By recursively trying out these different expansions and counting the number of cubes that they would generate we can determine which expansions lead to the minimum PKRM. The optimum expansions are stored in a cache.

The second pass, illustrated in FIG. 2B, then uses the expansions expansions that were stored in the cache by the first pass to actually generate the PKRM. FIGS. 2C-2D provide detailed pseudocode for functions that are used in the process illustrated in FIG. 2B. Given a truth table, and an empty ESOP cover, the second pass process recursively hashes the truth table of a function and uses the hash to retrieve the optimum expansions from the cache. When a constant 0 or 1 subfunction is encountered, a branch of the recursion has bottomed out, and we can potentially add a cube to the cover. When a cube $C_S$ is added, and a distance-0 or distance-1 cube $C_R$ is already present in the cover, we first apply ExorLink $C_S \oplus C_R$ and add the resulting cubes (if any) to the cover.

ESOP Minimization

After generating the initial seed ESOPs for the network, our goal is now to minimize these expressions. We do so by iteratively applying the ExorLink operator, in a manner based on the Exorcism family of algorithms, which are described in (1) N. Song and M. A. Perkowski, "EXOR-CISM-MV-2: Minimization of Exclusive Sum of Products Expressions for Multiple-valued Input incompletely Specified Functions," in Proc. ISMVL, 1993, pp. 132-137; (2) N. Song and M. A. Perkowski, "Minimization of Exclusive Sum of Products Expressions for Multiple-Valued Input," IEEE Trans. on CAD, vol. 15, no. 4, pp. 385-395, 1996; and (3) A. Mishchenko and M. A. Perkowski, "Fast heuristic minimization of exclusive-sums-of-products," in Proc. RM Workshop, 2001, pp. 242-250. These three documents are herein incorporated by reference in their entirety for describing the Exorcism family of algorithms.

Our minimization algorithm takes as input an initial ESOP cover. It then operates on this cover by iteratively applying the distance 2 to 4 ExorLink operation to suitable cube pairs. Recall from the previous discussion that whenever a cube $C_S$ is added to the cover, we first check for distance-0 or distance-1 cubes $C_R$, and apply $C_S \oplus C_R$ if we find any. Hence, there is no need for our procedure to explicitly apply ExorLink-0 or ExorLink-1. Instead, it tries to iteratively reshape the cover, accepting ExorLink operations between pairs of cubes if the result of ExorLinking would reduce the number of cubes or literals. We perform ExorLink on cube pairs up to distance 4. Note that our algorithm maintains the following invariants: (1) the current cover is functionally correct; and (2) the current cover is minimum with respect to ExorLink-0 or Exorlink-1 (in other words, for any pair of cubes $C_S$ and $C_R$ in the cover, the distance is at least 2).

XOR Refactoring

After ESOP collapsing and minimization, we have a logic network $G=(V_G;E_G; PI_G; PO_G; F_G)$, and a corresponding minimized multiple-output ESOP expression E. Our goal now is to factor this expression in such a way as to find a new multi-level representation for $F_G$ that is more efficient than G (i.e. in terms of logic levels and nodes). Further, we want this representation to be in terms of primitive gates. Primitive gates are simple logic gates that might be found in a standard cell library. They typically have a low fanin count and compute a simple logic function. Examples are the AND-2 and XOR-2 gates which compute the 2-input AND, and 2-input XOR functions, respectively.

At this point it becomes useful to establish some additional notation. Suppose that ESOP expression E contains m cubes. We say that $$\text{cubes}(E) = \bigcup_{i=1}^{m} \{C_i\}$$

is the set of cubes contained in E. Also, let us define cubes(E,i)⊆cubes(E) as the subset of cubes that affect output i.

FIG. 3A illustrates a process for XOR refactoring in accordance with some embodiments described herein. The pseudocode shown in FIG. 3A is self-explanatory. Specifically, the XOR refactoring approach illustrated in FIG. 3A separates optimization of the ESOP's EXOR logic from that of it's AND/INV logic, and then merges the two optimized parts back together. As such, the process consists of two main stages: (i) cube separation and (ii) XOR-tree construction.

After initializing constants and variables (initialization 302), the cube separation stage is executed (cube separation 304) in which the cubes are extracted from the XOR operators and optimize them separately. Recall that cubes are products of literals. Given this, is natural to convert cubes to AIGs. We can then use AIG optimization methods (AIG optimization 306) to optimize them to take advantage of logic sharing between cubes.

Suppose that our ESOP expression E contains m cubes. During cube separation we create a new intermediate logic network $G'=(V_{G'},E_{G'},O_{G'},F_{G'})$. As the ESOP expression has m cubes, G' has m outputs. Therefore, it computes a function $f_\mathbb{B}^{|I|} \to \mathbb{B}^m$. The function computed by output i is specified by the corresponding cube $C_i$. In other words, we now have established a one-to-one mapping C: cubes(E)→$PO_{G'}$.

After construction of G', we decompose it into an AIG network. We then use AIG rewriting techniques to further optimize it. Note that, at this point we have captured the AND/INV logic of E in terms of an optimized, multi-level representation in primitive AND-2 gates.

After finding an efficient representation of the AND/INV portion of the ESOP expression we still need to incorporate the EXOR logic. We do this by building, for each output of E, a balanced XOR-2 tree on top of the outputs of G'. Note that we can do this because each output of G' corresponds to one of E's cubes. Therefore, every output of original logic network G can be computed simply by applying EXOR operators to the outputs of G'.

By construction, we have cubes |cubes(E)|=|$PO_{G'}$|. In this second stage we build, for each window output $o_i \in PO_G$, an auxiliary network $G_i=(V_{G_i},E_{G_i},PI_{G_i},\overline{PO}_{G_i},F_i)$, such that $PI_{G_i}=C(\text{cubes}(E,i))\subseteq PO_{G'}$. Recall that C maps cubes to their corresponding outputs in G'. In other words, the inputs to EXOR tree $G_i$ are exactly those outputs of G' that correspond to the cubes used to compute the i-th output of G. Note that $F_i$ is the i-th projection of F.

In order to build these EXOR trees, we keep track of which cubes of E belong to which outputs. This allows us to incrementally build up the sets cubes(E; i) for each output. As these cubes correspond to outputs of G', we can build a balanced XOR tree by treating the outputs $PO_{G'}$ of G' as the leaves of the tree $G_i$. Such a tree can be computed recursively, starting from the initial set cubes(E; i). By removing the cube outputs from G' and adding to it the EXOR tree outputs $PO_{G_i}$ (XOR tree construction 308), we obtain a network whose functionality is by construction equivalent to that of G. This merged network has only primitive AND/INV gates at the bottom and primitive EXOR gates at the top.

FIG. 3B illustrates a process for XOR refactoring in accordance with some embodiments described herein. The process can begin by generating a set of ESOP expressions based on a logic network (step 352). Next, the process can minimize the set of ESOP expressions to obtain a set of minimized ESOP expressions (step 354). The process can then generate an intermediate logic network by extracting cubes from the set of minimized ESOP expressions (step 356). Recall that each cube is a product of literals, and each ESOP is an XOR of two or more cubes.

Next, the process can optimize the intermediate logic network to obtain an optimized intermediate logic network, wherein said optimizing the intermediate logic network comprises: (1) decomposing the intermediate logic network into an and-inverter graph (AIG), and (2) optimizing the AIG by using AIG rewriting techniques (step 358). Recall that the AIG is a network of AND gates whose inputs can be inverted. Finally, the process can construct an optimized logic network that is functionally equivalent to the logic network by adding a set of balanced XOR trees to the optimized intermediate logic network, wherein outputs of the optimized intermediate logic network are inputs to the set of balanced XOR trees, and wherein the outputs of the set of balanced XOR trees are primary outputs of the optimized logic network (step 360).

IC Design System

Figure 4:
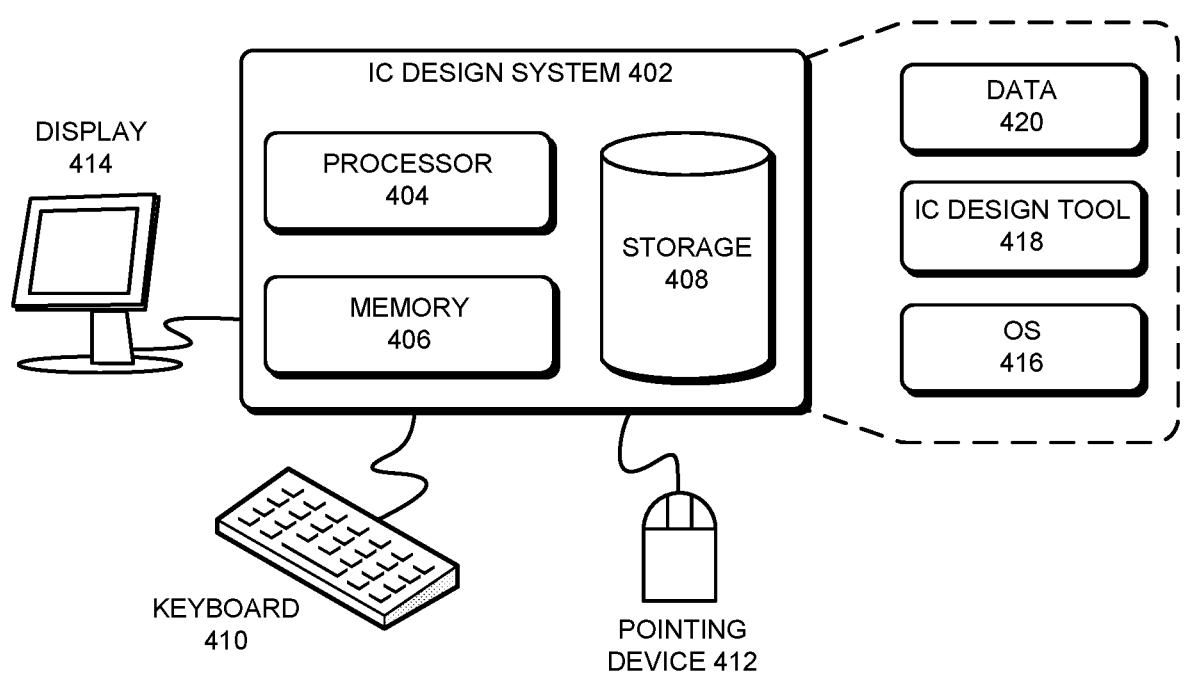
FIG. 4 illustrates an IC design system in accordance with some embodiments described herein.

The term "IC design system" generally refers to a hardware-based system that facilitates the design and manufacture of ICs. FIG. 4 illustrates an IC design system in accordance with some embodiments described herein. IC design system 402 can include processor 404, memory 406, and storage device 408. Specifically, memory locations in memory 406 can be addressable by processor 404, thereby enabling processor 404 to access (e.g., via load/store instructions) and manipulate (e.g., via logical/floating point/arithmetic instructions) the data stored in memory 406. IC design system 402 can be coupled to display device 414, keyboard 410, and pointing device 412. Storage device 408 can store operating system 416, IC design tool 418, and data 420. Data 420 can include input required by IC design tool 418 and/or output generated by IC design tool 418.

IC design system 402 may automatically (or with user help) perform one or more operations that are implicitly or explicitly described in this disclosure. Specifically, IC design system 402 can load IC design tool 418 into memory 406, and IC design tool 418 can then be used to produce a synthesized IC design, wherein the IC design tool 418 can perform equivalence checking between a netlist and an RTL design while producing the synthesized IC design. When the synthesized IC design is manufactured, the resulting IC chips contain the synthesized IC design which was optimized using ESOP refactoring techniques and systems described herein.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory storage medium storing instructions that, when executed by a processor, cause the processor to:
   generate a set of exclusive sum-of-product (ESOP) expressions based on a logic network in an integrated circuit (IC) design;
   minimize the set of ESOP expressions to obtain a set of minimized ESOP expressions;
   generate an intermediate logic network by extracting cubes from the set of minimized ESOP expressions;
   optimize the intermediate logic network to obtain an optimized intermediate logic network;
   construct an optimized logic network that is functionally equivalent to the logic network by adding a set of balanced exclusive-OR trees to the optimized intermediate logic network, wherein outputs of the optimized intermediate logic network are inputs to the set of balanced exclusive-OR trees, and wherein the outputs of the set of balanced exclusive-OR trees are outputs of the optimized logic network; and
   provide the IC design having the optimized logic network to an IC design flow.

2. The non-transitory computer-readable storage medium of claim 1, wherein said optimizing the intermediate logic network comprises:
   decomposing the intermediate logic network into an and-inverter graph (AIG); and
   optimizing the AIG.

3. The non-transitory computer-readable storage medium of claim 2, wherein the AIG is a network of AND gates whose inputs can be inverted.

4. The non-transitory computer-readable storage medium of claim 1, wherein each cube is a product of literals, and wherein each ESOP is an exclusive-OR of two or more cubes.

5. An apparatus, comprising:
   a memory storing instructions; and
   a processor coupled to the memory to execute the instructions, which when executed by the processor, cause the processor to:
   generate a set of exclusive sum-of-product (ESOP) expressions based on a logic network in an integrated circuit (IC) design;
   minimize the set of ESOP expressions to obtain a set of minimized ESOP expressions;
   generate an intermediate logic network by extracting cubes from the set of minimized ESOP expressions;
   optimize the intermediate logic network to obtain an optimized intermediate logic network;
   construct an optimized logic network that is functionally equivalent to the logic network by adding a set of balanced exclusive-OR trees to the optimized intermediate logic network, wherein outputs of the optimized intermediate logic network are inputs to the set of balanced exclusive-OR trees, and wherein the outputs of the set of balanced exclusive-OR trees are outputs of the optimized logic network; and
   provide the IC design having the optimized logic network to an IC design flow.

6. The apparatus of claim 5, wherein said optimizing the intermediate logic network comprises:
   decomposing the intermediate logic network into an and-inverter graph (AIG); and
   optimizing the AIG.

7. The apparatus of claim 6, wherein the AIG is a network of AND gates whose inputs can be inverted.

8. The apparatus of claim 5, wherein each cube is a product of literals, and wherein each ESOP is an exclusive-OR of two or more cubes.

9. A method, comprising:
   generating a set of exclusive sum-of-product (ESOP) expressions based on a logic network in an integrated circuit (IC) design;
   minimizing the set of ESOP expressions to obtain a set of minimized ESOP expressions;
   generating an intermediate logic network by extracting cubes from the set of minimized ESOP expressions;
   optimizing the intermediate logic network to obtain an optimized intermediate logic network; and
   constructing, by a processor, an optimized logic network that is functionally equivalent to the logic network by adding a set of balanced exclusive-OR trees to the optimized intermediate logic network, wherein output of the optimized intermediate logic network are inputs to the set of balanced exclusive-OR trees, and wherein the output of the set of balanced exclusive-OR trees are outputs of the optimized logic network; and providing the IC design having the optimized logic network to an IC design flow.

10. The method of claim 9, wherein said optimizing the intermediate logic network comprises:

decomposing the intermediate logic network into an and-inverter graph (AIG); and optimizing the AIG.

11. The method of claim 10, wherein the AIG is a network of AND gates whose inputs can be inverted.

12. The method of claim 9, wherein each cube is a product of literals, and wherein each ESOP is an exclusive-OR of two or more cubes.

* * * * *

UNITED STATES PATENT AND TRADEMARK OFFICE
CERTIFICATE OF CORRECTION

PATENT NO. : 10,839,117 B1
APPLICATION NO. : 16/126696
DATED : November 17, 2020
INVENTOR(S) : Amaru et al.

Page 1 of 1

It is certified that error appears in the above-identified patent and that said Letters Patent is hereby corrected as shown below:

In the Claims

Claim 9 (at Column 12, Line 65), please delete the word "output" and replace with "outputs"

Claim 9 (at Column 13, Line 1), please delete the word "output" and replace with "outputs"

Signed and Sealed this
Twenty-second Day of December, 2020

Andrei Iancu
*Director of the United States Patent and Trademark Office*